(12) United States Patent
Mills et al.

(10) Patent No.: US 10,318,946 B2
(45) Date of Patent: Jun. 11, 2019

(54) RECOMMENDED PAYMENT OPTIONS

(71) Applicant: PAYPAL, INC., San Jose, CA (US)

(72) Inventors: Benjamin Eroe Mills, San Francisco, CA (US); Juan Antonio Benitez, II, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 342 days.

(21) Appl. No.: 14/693,671

(22) Filed: Apr. 22, 2015

(65) Prior Publication Data

US 2015/0302383 A1 Oct. 22, 2015

Related U.S. Application Data

(60) Provisional application No. 61/982,748, filed on Apr. 22, 2014.

(51) Int. Cl.
*G06Q 20/22* (2012.01)

(52) U.S. Cl.
CPC .................. *G06Q 20/227* (2013.01)

(58) Field of Classification Search
USPC ........................................................ 705/39
See application file for complete search history.

(56) References Cited

U.S. PATENT DOCUMENTS

| | | | | |
|---|---|---|---|---|
| 7,177,838 B1 * | 2/2007 | Ling | .................. | G06Q 20/06 705/41 |
| 7,328,189 B2 * | 2/2008 | Ling | .................. | G06Q 20/04 705/41 |
| 7,548,915 B2 * | 6/2009 | Ramer | .................. | G06F 17/30867 705/14.54 |
| 7,606,560 B2 * | 10/2009 | Labrou | .................. | G06Q 20/18 455/410 |
| 7,784,684 B2 * | 8/2010 | Labrou | .................. | G06Q 20/32 235/375 |
| 7,848,980 B2 * | 12/2010 | Carlson | .................. | G06Q 20/04 705/35 |
| 7,992,779 B2 * | 8/2011 | Phillips | .................. | G06K 19/07309 235/375 |
| 8,380,177 B2 * | 2/2013 | Laracey | .................. | G06Q 30/0253 455/414.1 |
| 8,584,254 B2 * | 11/2013 | Cui | .................. | G06F 21/566 713/193 |
| 8,682,802 B1 * | 3/2014 | Kannanari | .................. | G06Q 20/367 705/64 |

(Continued)

OTHER PUBLICATIONS

Chun, Journal of Information Technology and Architecture vol. 8. No. 4, Dec. 2011, pp. 299-316 (Recommender) (Year: 2011).*

(Continued)

*Primary Examiner* — Chikaodinaka Ojiaku
(74) *Attorney, Agent, or Firm* — Haynes and Boone LLP

(57) ABSTRACT

Methods and systems for providing the most suitable payment methods to a user in a specific transaction are described. A service provider uses information obtained from a merchant about the transaction and information the service provider knows about a user to generate a list of possible payment methods. The service provider determines which payment methods the user may want to use for the transaction by looking at, for example, user preferences, merchant preferences, and past purchases made by the user, and the payment methods are displayed on a user device.

20 Claims, 4 Drawing Sheets

(56) References Cited

U.S. PATENT DOCUMENTS

| | | | | |
|---|---|---|---|---|
| 8,943,574 B2* | 1/2015 | Bailey | H04L 9/0891 | 726/9 |
| 9,032,217 B1* | 5/2015 | Brandwine | G06F 21/44 | 713/185 |
| 2004/0198386 A1* | 10/2004 | Dupray | H04W 64/00 | 455/456.1 |
| 2005/0109838 A1* | 5/2005 | Linlor | G06Q 20/04 | 235/380 |
| 2007/0055594 A1* | 3/2007 | Rivest | G06Q 20/10 | 705/35 |
| 2007/0061198 A1* | 3/2007 | Ramer | G06Q 20/12 | 705/14.53 |
| 2007/0061243 A1* | 3/2007 | Ramer | G06F 17/30905 | 705/37 |
| 2007/0061245 A1* | 3/2007 | Ramer | G06F 17/30867 | 705/37 |
| 2007/0061303 A1* | 3/2007 | Ramer | G06F 17/30864 | |
| 2007/0073717 A1* | 3/2007 | Ramer | G06F 17/30864 | |
| 2007/0073719 A1* | 3/2007 | Ramer | G06F 3/0346 | |
| 2007/0100650 A1* | 5/2007 | Ramer | G06F 17/30749 | 705/26.1 |
| 2007/0100652 A1* | 5/2007 | Ramer | G06F 17/30749 | 705/1.1 |
| 2007/0100805 A1* | 5/2007 | Ramer | G06F 17/30864 | |
| 2007/0106558 A1* | 5/2007 | Mitchell | G06Q 20/0453 | 705/16 |
| 2007/0118533 A1* | 5/2007 | Ramer | G06F 17/30749 | |
| 2007/0186105 A1* | 8/2007 | Bailey | H04L 63/0492 | 713/168 |
| 2007/0192294 A1* | 8/2007 | Ramer | G06Q 30/02 | |
| 2007/0198485 A1* | 8/2007 | Ramer | G06F 17/30867 | |
| 2007/0288427 A1* | 12/2007 | Ramer | G06F 17/30864 | |
| 2008/0214148 A1* | 9/2008 | Ramer | G06F 17/30749 | 455/414.1 |
| 2008/0214150 A1* | 9/2008 | Ramer | G06F 17/30749 | 455/414.1 |
| 2008/0214152 A1* | 9/2008 | Ramer | G06F 17/30749 | 455/414.1 |
| 2008/0214156 A1* | 9/2008 | Ramer | G06F 17/30749 | 455/414.1 |
| 2008/0214162 A1* | 9/2008 | Ramer | G06F 17/30749 | 455/414.2 |
| 2008/0214166 A1* | 9/2008 | Ramer | G06Q 30/02 | 455/414.3 |
| 2008/0215428 A1* | 9/2008 | Ramer | G06Q 30/02 | 705/14.53 |
| 2008/0215475 A1* | 9/2008 | Ramer | G06F 17/30867 | 705/37 |
| 2008/0215489 A1* | 9/2008 | Lawson | G06Q 20/389 | 705/50 |
| 2008/0215623 A1* | 9/2008 | Ramer | G06F 17/30749 | |
| 2008/0242279 A1* | 10/2008 | Ramer | G06F 17/30864 | 455/414.2 |
| 2009/0119204 A1* | 5/2009 | Akella | G06Q 20/10 | 705/39 |
| 2009/0144260 A1* | 6/2009 | Bennett | G06F 17/30681 | |
| 2009/0164327 A1* | 6/2009 | Bishop | G06Q 20/02 | 705/19 |
| 2009/0222329 A1* | 9/2009 | Ramer | G06F 17/30749 | 705/14.52 |
| 2009/0234711 A1* | 9/2009 | Ramer | G06F 17/30749 | 705/14.66 |
| 2009/0234745 A1* | 9/2009 | Ramer | G06F 17/30749 | 705/14.23 |
| 2009/0234861 A1* | 9/2009 | Ramer | G06F 17/30749 | |
| 2009/0240569 A1* | 9/2009 | Ramer | G06F 17/30749 | 715/864 |
| 2009/0240586 A1* | 9/2009 | Ramer | G06F 17/30905 | 705/14.64 |
| 2010/0063877 A1* | 3/2010 | Soroca | G06F 17/30749 | 705/14.45 |
| 2010/0076994 A1* | 3/2010 | Soroca | G06F 17/30749 | 707/769 |
| 2010/0082431 A1* | 4/2010 | Ramer | G06Q 30/02 | 705/14.52 |
| 2010/0094878 A1* | 4/2010 | Soroca | G06F 17/30035 | 707/748 |
| 2010/0120450 A1* | 5/2010 | Herz | H04M 3/42348 | 455/456.3 |
| 2010/0153211 A1* | 6/2010 | Ramer | G06Q 10/10 | 705/14.52 |
| 2010/0241571 A1* | 9/2010 | McDonald | G06Q 20/12 | 705/74 |
| 2012/0030109 A1* | 2/2012 | Dooley Maley | G06Q 20/35785 | 705/44 |
| 2012/0197794 A1* | 8/2012 | Grigg | G06Q 20/105 | 705/41 |
| 2012/0203700 A1* | 8/2012 | Ornce | G06Q 20/3278 | 705/67 |
| 2013/0110658 A1* | 5/2013 | Lyman | G06Q 20/20 | 705/18 |
| 2013/0159178 A1* | 6/2013 | Colon | G06Q 20/36 | 705/41 |
| 2013/0246258 A1* | 9/2013 | Dessert | G06Q 20/40 | 705/41 |
| 2013/0246259 A1* | 9/2013 | Dessert | G06Q 20/367 | 705/41 |
| 2013/0254115 A1* | 9/2013 | Pasa | G06Q 20/20 | 705/67 |
| 2013/0262315 A1* | 10/2013 | Hruska | G06Q 20/227 | 705/67 |
| 2014/0331278 A1* | 11/2014 | Tkachev | H04L 63/08 | 726/1 |
| 2014/0331282 A1* | 11/2014 | Tkachev | H04L 63/08 | 726/3 |
| 2015/0170148 A1* | 6/2015 | Priebatsch | G06Q 20/4016 | 705/44 |
| 2015/0254656 A1* | 9/2015 | Bondesen | G06Q 20/227 | 705/41 |
| 2017/0249689 A1* | 8/2017 | O'Neill | G06Q 30/0635 | |

OTHER PUBLICATIONS

Sarah Meiklejohn, A Fistful of Bitcoins, Characterizing Payments Among Men with No Names, (Bitcoins). , (Year: 2013).*

* cited by examiner

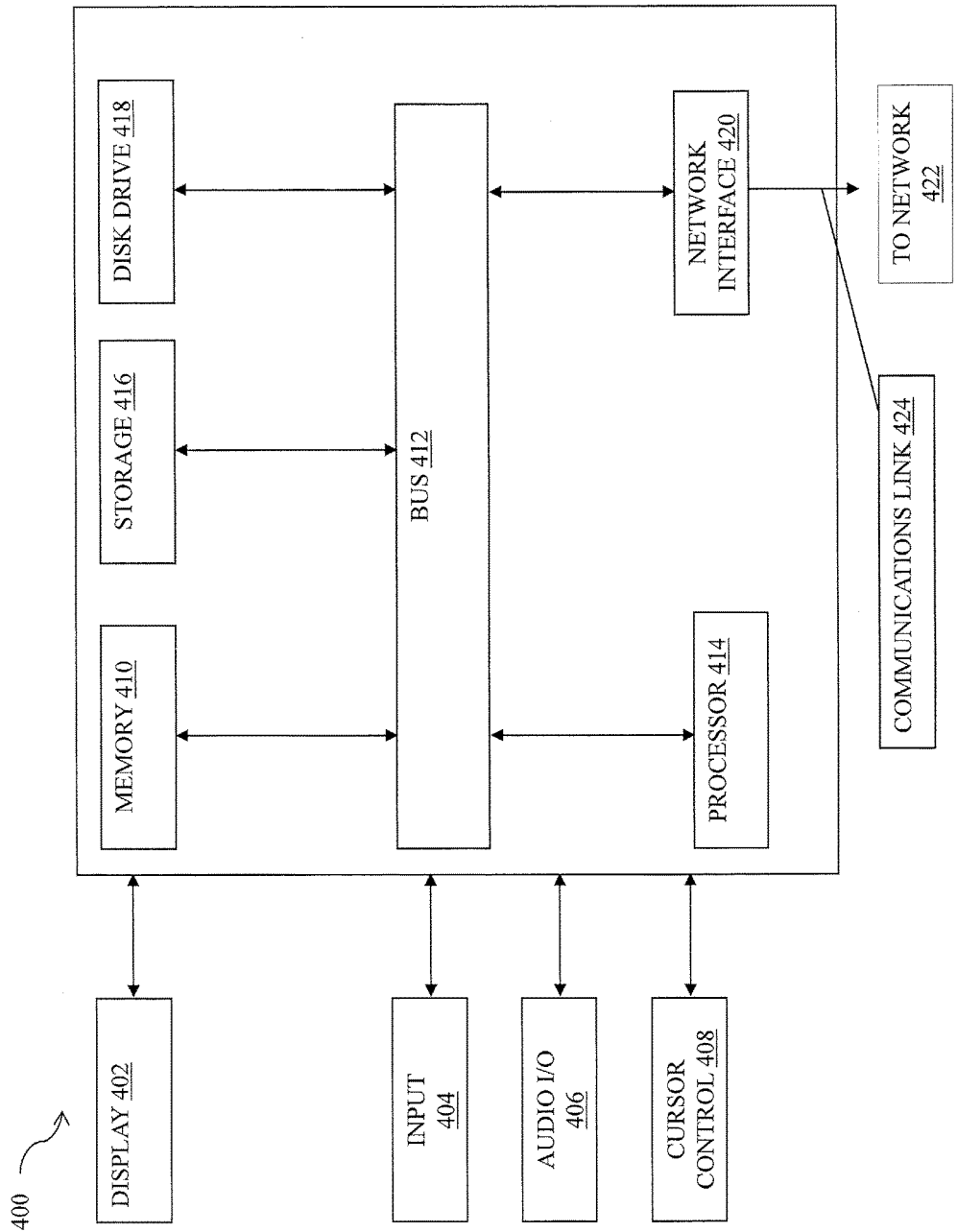

RECOMMENDED PAYMENT OPTIONS

CROSS-REFERENCE TO RELATED APPLICATION

Pursuant to 35 U.S.C. § 119(e), this application claims priority to the filing date of U.S. Provisional Patent Application No. 61/982,748, filed Apr. 22, 2014, which is incorporated by reference in its entirety.

BACKGROUND

Field of the Invention

The present invention generally relates to graphical user interfaces (GUIs) and more particularly to GUIs that present payment methods that are suitable for a user's present situation.

Related Art

An increasingly large number of payment methods have become available to consumers engaged in purchase transactions. A payment method is any method, medium, or service that may be used to effectuate payment in a transaction, such as credit cards, debit cards, gift cards, bank transfers, tokens, vouchers, store-specific credit cards, or any other forms of legal tender or exchange that may be used to complete a transaction. Consumers have the option of choosing between different types of payment methods when making a purchase. Various payment method providers, such as credit card companies, banks, and retailers, frequently provide consumers with multiple payment method options.

Due to the large number of payment methods to choose from, consumers can have a difficult time selecting one payment method and considering the factors associated with the selection. Thus, a need exists for systems and methods that facilitate the selection of payment methods.

BRIEF DESCRIPTION OF THE FIGURES

FIG. 4 is a block diagram of a system for implementing a device according to an embodiment of the present disclosure.

DETAILED DESCRIPTION

The present disclosure describes systems and methods that present the "best" payment methods to a user. Payment methods include credit cards, debit cards, gift cards, a PayPal® account, check or money order, bank account, etc. A service provider uses information obtained from a merchant and information that the service provider knows about a user to generate a list of payment methods for the user for display on a graphical user interface (GUI) of a user device, such as a smart phone, computing tablet, or personal computer. The service provider determines what payment methods a particular user will want to use for a specific purchase. For example, if the service provider determines that the purchase is made in a business setting, it can recommend using a company credit card. On the other hand, if the purchase is made in a personal setting, it can recommend using a personal credit card. In this way, a user is presented with the payment methods best suited for a particular transaction, and does not need to waste time going through all the possible payment methods to determine the one to use in the transaction. The GUI enables easy visualization and selection of a desired payment method.

Figure 1:
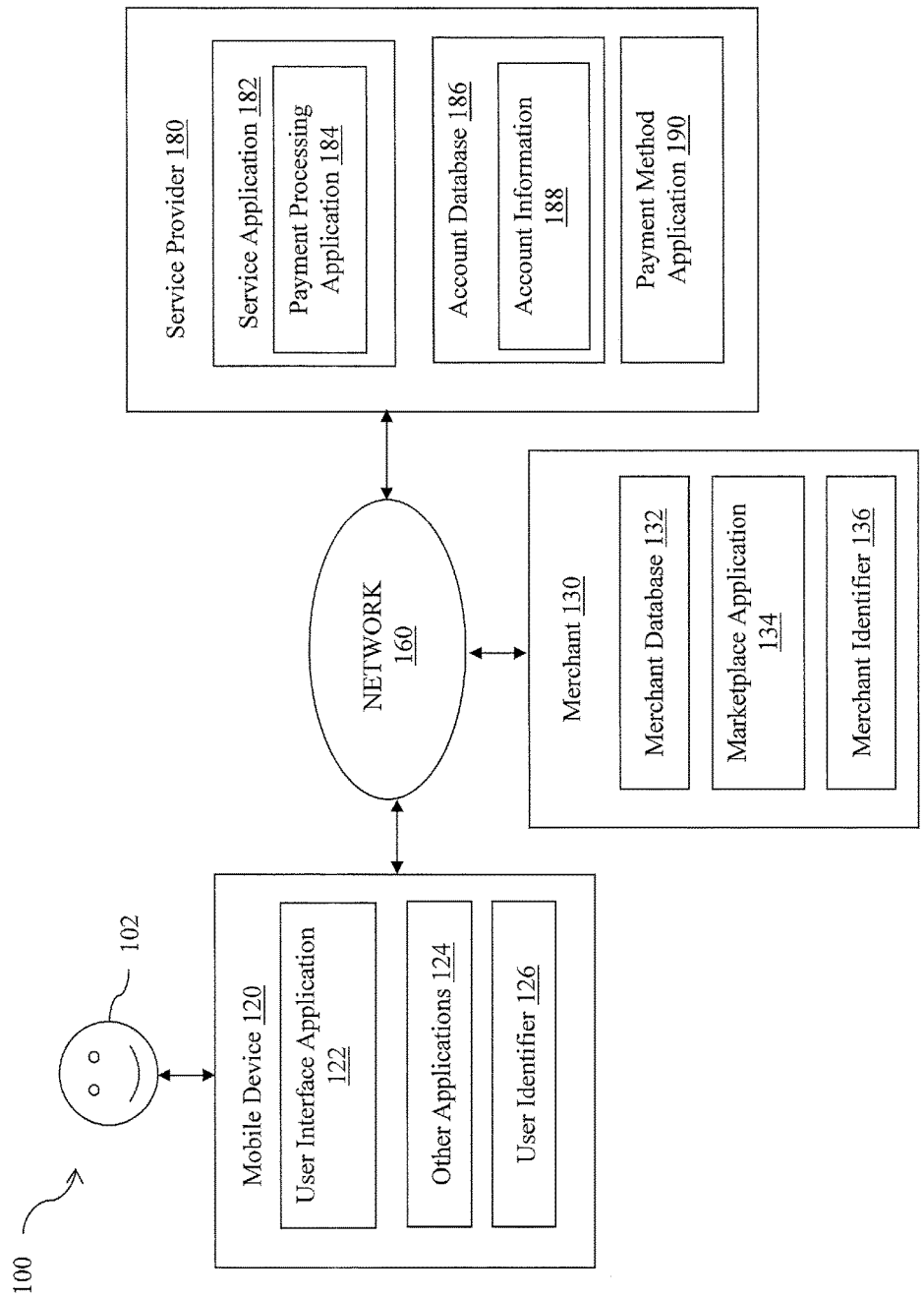
FIG. 1 is a block diagram illustrating a system for providing payment options according to an embodiment of the present disclosure.

FIG. 1 shows one embodiment of a block diagram of a network-based system 100 adapted to provide payment options using a mobile device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a mobile device 120 (e.g., a smartphone), a merchant server or device 130, and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The mobile device 120, in various embodiments, may be implemented using any appropriate combination of hardware and/or software configured for wired and/or wireless communication over the network 160. The mobile device 120, in one embodiment, may be utilized by the user 102 to interact with the service provider server 180 over the network 160. For example, the user 102 may conduct financial transactions (e.g., account transfers, bill payment, etc.) with the service provider server 180 via the mobile device 120. In various implementations, the mobile device 120 may include a wireless telephone (e.g., cellular or mobile phone), a tablet, a wearable computing device, a personal computer, a notebook computer, and/or various other generally known types of wired and/or wireless computing devices.

The mobile device 120, in one embodiment, includes a user interface application 122, which may be utilized by the user 102 to conduct transactions (e.g., shopping, purchasing, bidding, etc.) with the merchant device 130 or the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The mobile device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The mobile device 120, in one embodiment, includes a geo-location component adapted to monitor and provide an instant geographical location (i.e., geo-location) of the mobile device 120. In one implementation, the geo-location of the mobile device 120 may include global positioning system (GPS) coordinates, zip-code information, area-code information, street address information, and/or various other generally known types of geo-location information. In one example, the geo-location information may be directly entered into the mobile device 120 by a user via a user input component, such as a keyboard, touch display, and/or voice recognition microphone. In another example, the geo-location information may be automatically obtained and/or provided by the mobile device 120 via an internal or external GPS monitoring component. In other embodiments, the geo-location can be automatically obtained without the use of GPS. In some instances, cell signals or wireless signals are used. This helps to save battery life and to allow for better indoor location where GPS typically does not work.

In one aspect, when interfacing with the mobile device 120, user 102 may elect to provide or may be prompted to provide permission for the release of geo-location information. Accordingly, the user 102 may have exclusive authority to allow transmission of geo-location information from the mobile device 120 to the service provider server 180. In any instance, the service provider server 180 may communicate with the mobile device 120 via the network 160 and request permission to acquire geo-location information from the user 102 for geo-location based mobile commerce.

The mobile device 120 may include one or more of a motion sensor, an image sensor (e.g., camera), a voice sensor (e.g., microphone), an optical sensor, and any other kind of device suitable to collect information from a user and his or her environment. Motion sensors such as motion detectors, accelerometers and/or gyroscopes may monitor speed, acceleration, position, rotation, and other characteristics of body and appendage motion. The motion sensor captures movement of a user and his or her surroundings. An image sensor captures images of a user and other objects. A voice sensor captures voice or sounds. An optical sensor captures and characterizes light. Information captured by the sensors may be collected and transmitted to the service provider server 180.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering items to the user 102 over the network 160. As such, each of the one or more merchant servers 130 may include a merchant database 132 for identifying items for sale, which may be made available to the mobile device 120 for viewing and purchase by the user 102. In one or more embodiments, user 102 may complete a transaction such as purchasing the items via the service provider server 180.

Each of the merchant servers 130, in one embodiment, may include a marketplace application 134, which may be configured to provide information over the network 160 to the user interface application 122 of the mobile device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. In various embodiments, user 102 may conduct transactions (e.g., searching, selection, monitoring, purchasing, and/or providing payment for items) with each merchant server 130 via the service provider server 180 over the network 160.

A merchant website may also communicate (for example, using merchant server 130) with the service provider through service provider server 180 over network 160. For example, the merchant website may communicate with the service provider in the course of various services offered by the service provider to merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of service provider as a payment intermediary. The merchant website may also have an account with the service provider.

The service provider server 180, in one embodiment, may be maintained by a transaction processing entity, which may provide processing for financial transactions and/or information transactions between the user 102 and merchant server 130. As such, the service provider server 180 includes a service application 182, which may be adapted to interact with the mobile device 120 and/or merchant server 130 over the network 160. In one example, the service provider server 180 may be provided by Braintree®, PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., user 102) and merchants. For example, account information 188 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes payment method application 190. Payment method application 190 receives merchant acquired information and combines it with information known by the service provider to determine which payment methods the user 102 likely wants to use in a specific transaction. The service provider can take into account a variety of factors including user preferences, merchant preferences, user device capabilities, location of merchant or user, item purchased, cost of item purchased, and/or rewards or incentives associated with different payment methods, and payment environment. The payment method application 190 generates a nonce for each payment method and sends a list of recommended payment methods to a merchant. The merchant can then render a checkout screen with the recommended payment methods so that the user 102 can select one.

Figure 2:
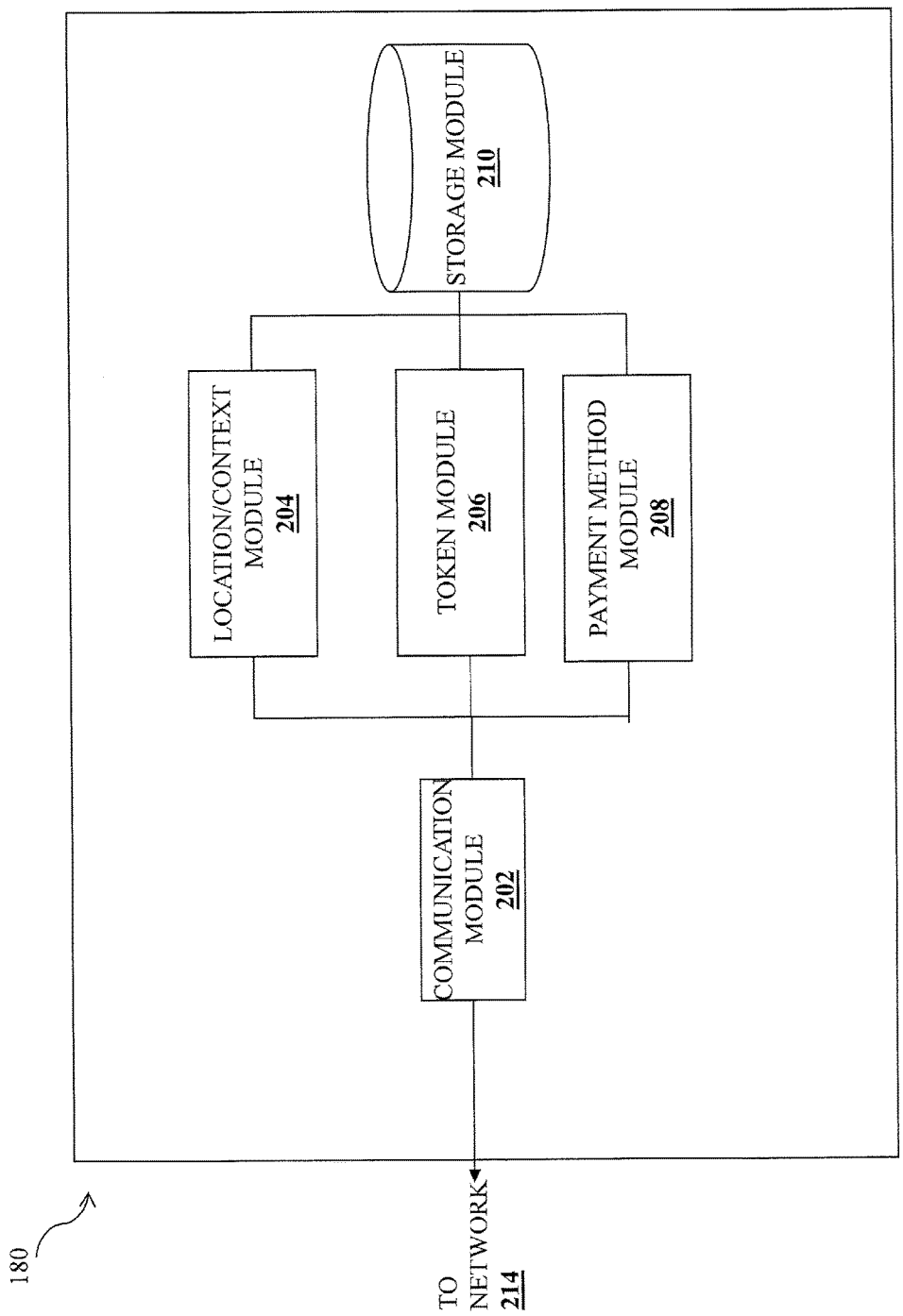
FIG. 2 is a block diagram illustrating a service provider server according to an embodiment of the present disclosure.

FIG. 2 illustrates an embodiment of the service provider server 180. The server 180 includes several components or modules, such as a communication module 202, location/context module 204, token module 206, payment method module 208, and storage module 210.

The server 180 includes a communication module 202 that is coupled to the network 214 and to any or all of a location/context module 204, token module 206, payment method module 208, any of which may be coupled to a storage module 210. Any or all of the modules 202-208 may be implemented as a subsystem of server 180 including for example, a circuit, a hardware component, a hardware subcomponent, and/or a variety of other subsystems known in the art. Furthermore, any or all of the modules 202-208 may be preconfigured to perform their disclosed functionality, or may be configured by a processing system "on-the-fly" or as needed to perform their disclosed functionality. As such, any or all of the modules 202-208 may include pre-configured and dedicated circuits and/or hardware components of the server 180, or may be circuits and/or hardware components that are configured as needed.

For example, any or all of the modules 202-208 may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 202-208 to perform the functions described below. As such, in some embodiments, preconfigured and dedicated circuits may be implemented to perform the functions of the modules 202-208. In other embodiments, a processing system may execute instructions on a non-transitory, computer-readable medium to configure one or more circuits as needed to perform the functions of the modules 202-208.

The communication module 202 may be included as a separate module provided in the server 180, or may be provided using instructions stored on a computer-readable medium that, when executed by a processing system in the server 180, configure the communication module 202 to send and receive information over the network 214, as well as provide any of the other functionality that is discussed herein. The location/context module 204 may be included as a separate module provided in the server 180, or may be provided using instructions stored on a computer-readable medium that, when executed by a processing system in the server 180, configure the location/context module 204 to determine or receive a location of a user and the context of a user purchase, as well as provide any of the other functionality that is discussed herein. The token module 206 may be included as a separate module provided in the server 180, or may be provided using instructions stored on a computer-readable medium that, when executed by a processing system in the server 180, configure token module 206 to generate a token for a merchant, as well as provide any of the other functionality that is discussed herein. The payment method module 208 may be included as a separate module provided in the server 180, or may be provided using instructions stored on a computer-readable medium that, when executed by a processing system in the server 180, configure the payment method module 208 to determine the best payment methods for a user. In some embodiments, the payment method module 208 identifies a set of parameters in a transaction and compiles a set of recommended payment methods using a user profile and the parameters. Furthermore, other modules discussed above but not illustrated in FIG. 2 may be provided as separate modules on the server 180, or using instructions stored on a computer-readable medium similarly as discussed above. While the storage module 210 has been illustrated as located in the server 180, one of ordinary skill in the art will recognize that it may include multiple storage modules and may be connected to the modules 204-208 through the network 214 without departing from the scope of the present disclosure.

Figure 3:
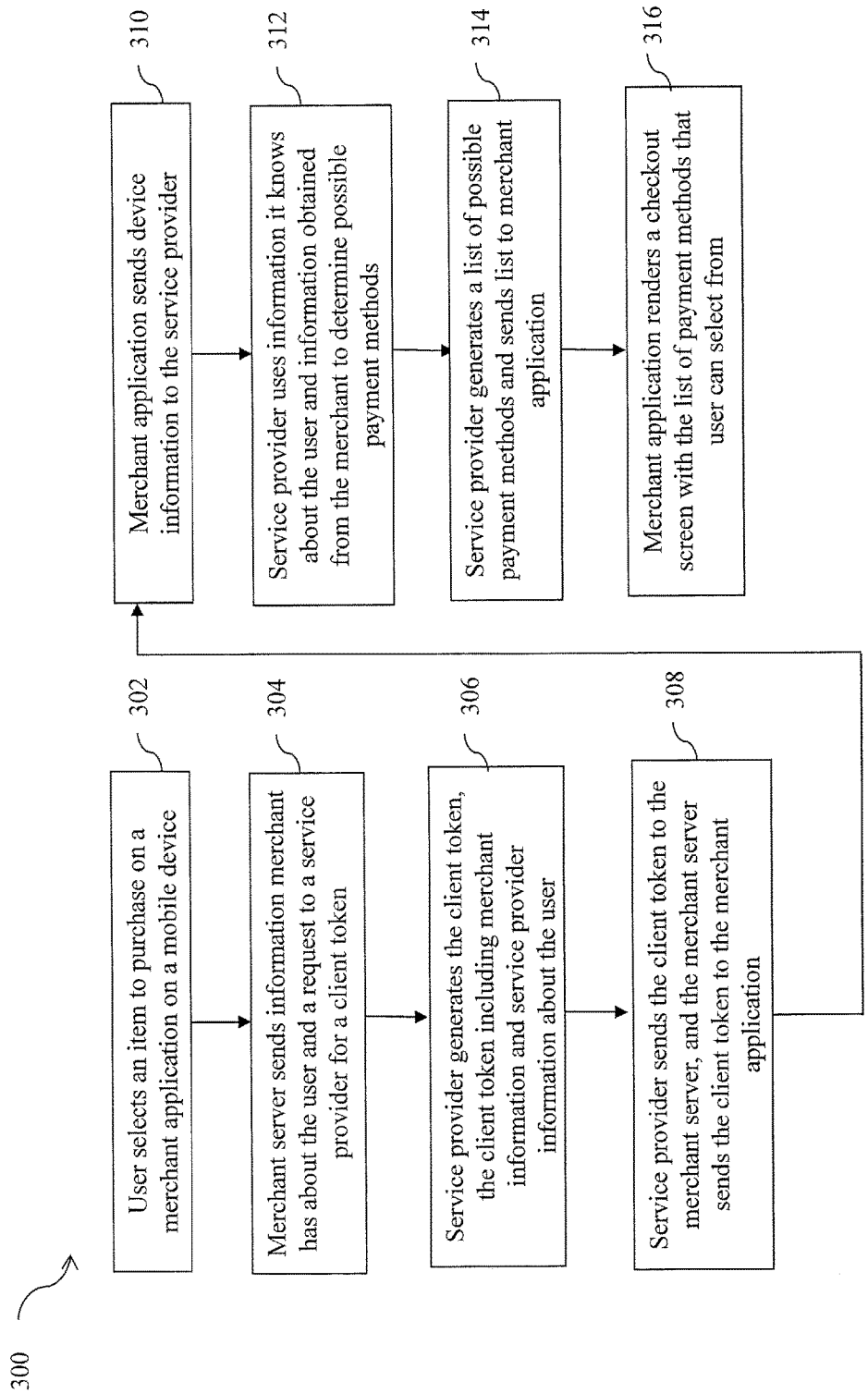
FIG. 3 is a flowchart showing a method for providing payment options according to an embodiment of the present disclosure.

Referring now to FIG. 3, a flowchart 300 of a method for providing payment methods is illustrated according to an embodiment of the present disclosure. At step 302, the user 102 selects an item (i.e., good or service) to purchase from a merchant using the merchant's application on the mobile device 120.

At step 304, the merchant server 130 sends a request to the service provider server 180 for a client token, along with information the merchant has about the user 102. The merchant may have information pertaining to the transaction with the user 102, such as transaction amount, item description, item prices, total price, shipping costs, tax, etc.

At step 306, the service provider server 180 (e.g., token module 206) generates a client token. The client token includes information the service provider has for the user 102 based on past interactions with the user 102 and the information provided by the merchant in step 304. The information that the service provider may have includes past items purchased, past merchants the user 102 purchased from, past payment methods used, etc. In various embodiments, the service provider server 180 accumulates information about the user 102 and stores it in its database. This information can be referred by a token. The client token is just one transport mechanism that is used to hold and move information about the user 102.

At step 308, the service provider server 180 sends the client token to the merchant server 130. The merchant server 130 takes the client token and sends it to the merchant application on the mobile device 120.

At step 310, the merchant application sends device information, such as location, model number, and/or operation system version of the device, to the service provider server 180 to generate a list of payment methods for the user 102. In various embodiments, the merchant application can access time and calendar information on the mobile device 120, and transmits this information to the service provider server 180 as well. Time and calendar information can provide context for the transaction, and assist the service provider in determining what payment methods should be used. The device information is useful because it can tell the service provider server 180 what payment methods are supported on the mobile device 120.

At step 312, the service provider server 180 (e.g., payment method module 208) uses the information it knows about the user 102 and the information provided by the merchant to determine what payment method(s) the user 102 may want to use for the purchase. Factors considered by the service provider server 180 can include time, user preferences, location of the user 102, payment methods accepted by the merchant, how often a payment method is used by the user 102, type or category of merchant, type or category of item purchased, transaction amount, identity of item purchased, and payment methods supported by the mobile device 120.

Other factors can include what promotional offers, rewards, incentives, and/or points are associated with a payment method. To choose a payment method when making a transaction, the service provider may consider questions such as: may a card with rewards be used for this transaction; has the reward limit for a card been reached; is it beneficial to use one card with rewards over another; may a gift card that is close to expiring be used for this transaction; is this transaction personal or business related; and the like.

In one example, one of the payment methods selected for presentation to the user is the payment method with the highest frequency of being used. In another example, the user 102 may have previously expressed his or her wishes to never, sometimes, or always to use or not use a particular payment method. For example, the user 102 may wish to use an American Express® card on product-type merchandise, rather than use the card to purchase airline tickets or resort lodging. Thus, if the user 102 is purchasing a Disney® Frozen Sparkle Princess Elsa Doll, the service provider presents the American Express® card as a possible payment method. In some embodiments, these preferences may be input via a user survey, collected in a database, or expressed via real-time filters to then filter or determine the payment options which are presented to the user 102.

In various embodiments, the service provider server 180 identifies a set of parameters associated with the transaction. Examples of such parameters include a category or type of business associated with the transaction, a location of the transaction, a category or type of item purchased by the user 102 in the transaction, purchase price, an identity of an item purchased by the user 102 in the transaction, and an identity of the particular store or branch at which the transaction is located. The service provider can evaluate these parameters and extract the payment method(s) most likely to be favored by the user 102. For example, the user 102 may like to use a Chase® credit card when he or she buys shoes from the Nordstrom® department store in Newport Beach, Calif., but favors the Macy's® credit card when shopping for clothing at the Macy's® department store in Costa Mesa, Calif. If the user 102 is now buying food from the Nordstrom® Café Bistro in Irvine, Calif., the service provider may select the Chase® credit card as one of the possible payment methods.

The service provider server 180 can compile a set of recommended payment methods using the user profile and the set of parameters. The user profile contains characteristics about the user 102. For example, the user profile may contain information related to the identity of the user 102, such as a name, address, phone number, e-mail address, and other biographical data for the user 102. Additionally, the user profile may contain information related to the types of payment methods owned, available, or used by user 102. For example, the user profile may indicate the number and type of credit cards, debit cards, gift cards, and store-specific credit cards owned or used by the user 102. The user profile may also contain account information for each payment method owned or used by the user 102.

At step 314, the service provider server 180 generates a list of possible payment methods, and sends the list to the merchant application. For each payment method in the list, the service provider may generate a nonce, and this nonce may be sent to the merchant application. The nonce is a one-time use token that points to a specific payment method. The nonce can be used to create transactions, customers, or subscriptions.

At step 316, the merchant application renders a checkout screen with the list of payment methods so that user 102 can select one payment method. If the user 102 selects a payment method associated with a nonce, the merchant application sends the nonce to the merchant server 130. The merchant server uses the nonce to create a transaction, create a customer, store it in their vault, create a subscription, or exchange the nonce for a payment method. In various embodiments, the nonce is transmitted to the service provider server 180 to process the purchase using the payment method associated with the nonce.

If the user 102 selects a payment method that is not associated with a nonce, the user 102 interacts with a user interface rendered by the service provider server 180 inside the merchant application. The result of that interaction is a nonce. The nonce can then be sent to the merchant server 130, and transmitted to the service provider server 180 for processing payment.

FIG. 4 is a block diagram of a computer system 400 suitable for implementing one or more embodiments of the present disclosure, including the mobile device 120, the merchant device or server 130, and the service provider server 180. In various implementations, the mobile device 120 may comprise a mobile cellular phone, personal computer (PC), laptop, wearable computing device, etc. adapted for wireless communication, and the merchant server or device 130 and service provider server 180 may comprise a network computing device, such as a server. Thus, it should be appreciated that the devices 120, 130, and 180 may be implemented as computer system 400 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a merchant server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system of a payment service provider, comprising:
a non-transitory memory; and
one or more hardware processors coupled with the non-transitory memory and configured to read instructions from the non-transitory memory to cause the system to perform operations comprising:
receiving a request for a client token from a merchant server, the request received subsequent to a purchase request associated with a purchase transmitted to the merchant server from a user device of a user and prior to the user providing payment information to the merchant server for the purchase, wherein the purchase request comprises information related to the purchase;

receiving merchant acquired information of the user that corresponds to the purchase request;

in response to receiving the request and the merchant acquired information of the user, identifying, from a plurality of user accounts with the payment service provider, a user account associated with the user based on the merchant acquired information of the user, wherein the user account includes information related to a plurality of payment methods available to the user and user behavior information derived from past interactions with the user, wherein each payment method in the plurality of payment methods is associated with a set of hardware component requirements and a set of software component requirements;

generating a client token for the purchase based on the merchant acquired information of the user and the user behavior information of the user;

transmitting the client token to the merchant server, the transmitting, causing the merchant server to forward the client token to an application associated with the merchant server and executed on the user device;

based on the client token being forwarded to the application executed on the user device, receiving, from the application executed on the user device, device information corresponding to the user device, wherein the device information comprises location information obtained from a location component of the user device, information associated with a hardware component of the user device, and information associated with a software component of the user device;

in response to receiving the device information from the application executed on the user device, selecting, based on the merchant acquired information, the user behavior information, and the device information, a subset of payment methods for the purchase from the plurality of payment methods available to the user, wherein the subset of payment methods is selected based at least in part on the hardware component and the software component of the user device satisfying the set of hardware component requirements and the set of software component requirements associated with each payment method in the subset of payment methods;

generating a set of single-use payment tokens, each single-use payment token of the set of single-use payment tokens corresponding to using a respective payment method included in the subset of payment methods for the purchase;

transmitting the set of single-use payment tokens to the application executed on the user device, the transmitting causing the application to display the subset of payment methods in a checkout page of the application displayed on the user device;

receiving, from the application executed on the user device, a first single-use payment token of the set of single-use payment tokens, the first single-use payment token corresponding to a first payment method included in the subset of payment methods for the user; and in response to receiving the first single-use payment token from the application executed on the user device, processing an electronic payment transaction between the user and a merchant associated with the merchant server for the purchase using the first payment method based on the first single-use payment token.

2. The system of claim 1, wherein the information related to the purchase comprises at least one of a transaction amount, an item description, an item price, a total price, a shipping cost, or a tax amount.

3. The system of claim 1, wherein the user behavior information comprises at least one of a user identity, a type of payment methods used by the user, past purchase transactions information of the user, or a payment frequency associated with a payment method.

4. The system of claim 1, wherein the operations further comprise:
receiving, from the application, time and calendar information stored on the user device, wherein the selecting the subset of payment methods for the purchase is further based on the time and calendar information.

5. The system of claim 1, wherein the information associated with the hardware component of the user device comprises a model number of the user device.

6. The system of claim 1, wherein the information associated with the software component of the user device comprises a version of an operating system running on the user device, and wherein the operations further comprise determining that the first payment method is supported by the user device based on the version of the operation system running on the user device.

7. The system of claim 1, wherein the request comprises an identifier of the merchant, and wherein the subset of payment methods is selected further based on the identifier of the merchant.

8. A method for providing payment methods, comprising:
receiving, by a service provider server comprising one or more hardware processors, a request for a client token from a merchant server, the request received subsequent to a purchase request associated with a purchase transmitted to the merchant server from a user device of a user and prior to the user providing payment information to the merchant server for the purchase, wherein the purchase request comprises information related to the purchase;

receiving, by the service provider server, merchant acquired information of the user that corresponds to the purchase request;

in response to receiving the request and the merchant acquired information of the user, identifying, by the service provider server from a plurality of user accounts with the service provider server, a user account associated with the user based on the merchant acquired information of the user, wherein the user account includes information related to a plurality of payment methods available to the user and user behavior information derived from past interactions between the service provider server and the user, wherein each payment method in the plurality of payment methods is associated with a set of hardware component requirements and a set of software component requirements;

generating, by the service provider server, a client token for the purchase based on the merchant acquired information and the user behavior information of the user;

transmitting, by the service provider server, the client token to the merchant server, the transmitting causing the merchant server to forward the client token to an application associated with the merchant server and executed on the user device;

based on the client token being forwarded to the application executed on the user device, receiving, by the service provider server from the application executed on the user device, device information corresponding to the user device, wherein the device information comprises location information obtained from a location component of the user device, information associated with a hardware component of the user device, and information associated with a software component of the user device;

in response to receiving the device information from the application executed on the user device, selecting, by the service provider server based on the merchant acquired information, the user behavior information, and the device information, a subset of payment methods for the purchase from the plurality of payment methods available to the user, wherein the subset of payment methods is selected based at least in part on the hardware component and the software component of the user device satisfying the set of hardware component requirements and the set of software component requirements associated with each payment method in the subset of payment methods;

generating, by the service provider server, a set of single-use payment tokens, each single-use payment token of the set of single-use payment tokens corresponding to using a respective payment method included in the subset of payment methods for the purchase;

transmitting, by the service provider server, the set of single-use payment tokens to the application executed on the user device, the transmitting causing the application to display the subset of payment methods on the user device;

receiving, by the service provider server from the application the user device, a first single-use payment token of the set of single-use payment tokens, the first single-use payment token corresponding to a first payment method included in the subset of payment methods for the user; and in response to receiving the first single-use payment token from the application of executed on the user device, processing, by the service provider server, a payment transaction between the user and a merchant associated with the merchant server for the purchase using the first payment method based on the first single-use payment token.

9. The method of claim 8, wherein the information related to the purchase comprises at least one of a transaction amount, an item description, an item price, a total price, a shipping cost, or a tax amount.

10. The method of claim 8, wherein the user behavior information comprises at least one of a user identity, a type of payment methods used by the user, past purchase transactions information of the user, or a payment frequency associated with a payment method.

11. The method of claim 8, further comprising receiving, by the service provider server from the application, time and calendar information stored on the user device, wherein the selecting the subset of payment methods for the purchase is further based on the time and calendar information.

12. The method of claim 8, wherein the information associated with the hardware component of the user device comprises a model number of the user device, and wherein the method further comprises determining that a second payment method of the plurality of payment method not included in the subset of payment method is unsupported by the user device based on the model number.

13. The method of claim 8, wherein the information associated with the software component of the user device comprises a version of an operating system running on the user device, and wherein the method further comprises determining that the first payment method is supported by the user device based on the version of the operation system running on the user device.

14. A non-transitory machine-readable medium having stored thereon machine-readable instructions executable to cause a machine associated with a payment service provider to perform operations comprising:

receiving a request for a client token from a merchant server, the request received subsequent to a purchase request associated with a purchase transmitted to the merchant server from a user device of a user and prior to the user providing payment information to the merchant server for the purchase, wherein the purchase request comprises information related to the purchase;

receiving merchant acquired information of the user that corresponds to the purchase request;

in response to receiving the request and the merchant acquired information of the user, identifying, from a plurality of user accounts with the payment service provider, a user account associated with the user based on the merchant acquired information of the user, wherein the user account includes information related to a plurality of payment methods available to the user and user behavior information derived from past interactions with the user, wherein each payment method in the plurality of payment methods is associated with a set of hardware component requirements and a set of software component requirements;

generating a client token for the purchase based on the merchant acquired information of the user and the user behavior information of the user;

transmitting the client token to the merchant server, the transmitting causing the merchant server to forward the client token to an application of associated with the merchant server and executed on the user device;

based on the client token being forwarded to the application executed on the user device, receiving, from the application executed on the user device, device information corresponding to the user device, wherein the device information comprises location information obtained from a location component of the user device, information associated with a hardware component of the user device, and information associated with a software component of the user device;

in response to receiving the device information from the application executed on the user device, selecting, based on the merchant acquired information, the user behavior information, and the device information, a subset of payment methods for the purchase from the plurality of payment methods available to the user, wherein the subset of payment methods is selected based at least in part on the hardware component and the software component of the user device satisfying the set of hardware component requirements and the set of software component requirements associated with each payment method in the subset of payment methods;

generating a set of single-use payment tokens, each single-use payment token of the set of single-use payment tokens corresponding to a respective payment method included in the subset of payment methods for the purchase;

transmitting the set of single-use payment tokens to the application executed on the user device, the transmitting causing the application to display the subset of payment methods on the user device;

receiving, from the application executed on the user device, a first single-use payment token of the set of single-use payment tokens, the first single-use payment token corresponding to a first payment method included in the subset of payment methods for the user; and in response to receiving the first single-use payment token from the application executed on the user device, processing a payment transaction between the user and a merchant associated with the merchant server for the purchase using the first payment method based on the first single-use payment token.

15. The non-transitory machine-readable medium of claim 14, wherein the device information comprises at least one of a transaction amount, an item description, an item price, a total price, a shipping cost, or a tax amount.

16. The non-transitory machine-readable medium of claim 14, wherein the user behavior information comprises at least one of a user identity, a type of payment methods used by the user, past purchase transactions information of the user, or a payment frequency associated with a payment method.

17. The non-transitory machine-readable medium of claim 14, wherein the operations further comprise:

receiving, from the application, time and calendar information stored on the user device, wherein the selecting the subset of payment methods for the purchase is further based on the time and calendar information.

18. The non-transitory machine-readable medium of claim 14, wherein the information associated with the hardware component of the user device comprises a model number of the user device.

19. The non-transitory machine-readable medium of claim 14, wherein the merchant acquired information of the user comprises user identity information associated with the user.

20. The non-transitory machine-readable medium of claim 14, wherein the information associated with the software component of the user device comprises a version of an operating system running on the user device, and wherein the operations further comprise determining that the first payment method is supported by the user device based on the version of the operation system running on the user device.

* * * * *

UNITED STATES PATENT AND TRADEMARK OFFICE
CERTIFICATE OF CORRECTION

PATENT NO. : 10,318,946 B2
APPLICATION NO. : 14/693671
DATED : June 11, 2019
INVENTOR(S) : Benjamin Eroe Mills et al.

Page 1 of 1

It is certified that error appears in the above-identified patent and that said Letters Patent is hereby corrected as shown below:

In the Claims

In Column 11, Line 26 Claim 1 delete "transmitting," and add "transmitting"

In Column 13, Line 44 Claim 8 delete "of"

In Column 14, Line 42 Claim 14 delete "of"

Signed and Sealed this
Twenty-ninth Day of October, 2019

Andrei Iancu
*Director of the United States Patent and Trademark Office*